US012142044B2

(12) United States Patent
Soman et al.

(10) Patent No.: US 12,142,044 B2
(45) Date of Patent: Nov. 12, 2024

(54) METHOD AND SYSTEM FOR ENRICHING LIVESTREAMING CONTENT FOR CONTENT VIEWERS

(71) Applicant: Star India Private Limited, Mumbai (IN)

(72) Inventors: Nikhil Soman, Mumbai (IN); Lenin S. D'Souza, Mumbai (IN); Piyush Chourasiya, Mumbai (IN); Sanjit M. Rane, Mumbai (IN)

(73) Assignee: STAR INDIA PRIVATE LIMITED, Mumbai (IN)

( * ) Notice: Subject to any disclaimer, the term of this patent is extended or adjusted under 35 U.S.C. 154(b) by 29 days.

(21) Appl. No.: 17/715,942

(22) Filed: Apr. 7, 2022

(65) Prior Publication Data

US 2022/0327832 A1 Oct. 13, 2022

(30) Foreign Application Priority Data

Apr. 9, 2021 (IN) .............................. 202121016853

(51) Int. Cl.
*G06V 20/40* (2022.01)
*H04N 21/2187* (2011.01)
*H04N 21/4402* (2011.01)

(52) U.S. Cl.
CPC ......... *G06V 20/44* (2022.01); *H04N 21/2187* (2013.01); *H04N 21/44029* (2013.01)

(58) Field of Classification Search
CPC .... G06V 20/44; G06V 20/42; H04N 21/2187; H04N 21/44029; H04N 21/2335; H04N 21/23418; H04H 20/38
See application file for complete search history.

(56) References Cited

U.S. PATENT DOCUMENTS

| 9,138,652 | B1 * | 9/2015 | Thompson | H04N 21/237 |
| 10,897,647 | B1 * | 1/2021 | Hunter Crawley | H04N 21/8547 |
| 11,140,328 | B2 * | 10/2021 | Schwartz | H04N 23/661 |
| 11,731,047 | B2 * | 8/2023 | Moskowitz | A63F 13/47 463/31 |
| 11,875,567 | B2 * | 1/2024 | Ricciardi | H04N 21/8549 |
| 2016/0247328 | A1 * | 8/2016 | Han | H04N 21/8549 |
| 2016/0366203 | A1 * | 12/2016 | Blong | H04L 65/612 |

* cited by examiner

*Primary Examiner* — Alazar Tilahun
(74) *Attorney, Agent, or Firm* — Kwan & Olynick LLP

(57) ABSTRACT

A method and system for enriching livestreaming content for viewers are disclosed. An event occurring within a livestreaming content is detected. The livestreaming content is viewed by a plurality of viewers on respective electronic devices. Event data associated with the detected event is determined based on one or more event attributes captured by one or more data sources associated with the livestreaming content. An event type associated with the detected event is determined based on event data and a plurality of event profiles stored in an event database. At least one applause audio from among a plurality of pre-recorded applause audios stored at an applause repository is identified based on the event type and event data. Thereafter, the livestreaming content is adapted based on the at least one applause audio and an event status flag associated with the detected event to enrich the livestreaming content for the plurality of viewers.

22 Claims, 9 Drawing Sheets

METHOD AND SYSTEM FOR ENRICHING LIVESTREAMING CONTENT FOR CONTENT VIEWERS

CROSS REFERENCE TO RELATED APPLICATIONS

This application claims priority from Indian provisional patent application 202121016853, filed on Apr. 9, 2021, which is incorporated herein in its entirety by this reference thereto.

TECHNICAL FIELD

The present technology generally relates to the delivery of content such as streaming content to content viewers and, more particularly, to a method and system for providing enriched livestreaming content to content viewers.

BACKGROUND

In recent times, digital content streaming, and especially livestreaming content, has been hugely popular among viewers of digital content. Livestreaming of content, i.e., streaming audiovisuals of live events from event venues in substantially real-time enables content viewers to view a variety of live events in an affordable and convenient way. For example, content viewers may be provided with options to view livestreaming content related to sports, musical shows, theatrical performances, etc., which are held at different, remote event venues. The content viewers may pick and choose the content of their choice and watch the content in real-time without having to pay expensive ticketing fees or endure the hassle of traveling to the respective event venues.

For all the benefits that livestreaming of content provides, there are also some associated drawbacks to livestreaming of content. For example, a content viewer may not be able to experience the same feeling or vibe as that of physically attending the live event. In one illustrative example, a passage of a cricket match or a football game may not involve any interesting moments. Moreover, the live commentary during such an uninteresting passage may also be unappealing, thereby causing a content viewer to lose interest in watching the livestreaming content.

Some recent solutions offer chat rooms to viewers of livestreaming content to enable content viewers to interact with other content viewers and express their emotions during livestreaming. However, in many scenarios, a number of content viewers engaged in chatting may be less, and as such, the content viewer may feel bored due to a lack of interesting engagement with other content viewers. Some content provider applications provide options to content viewers to share emoticons, animated Graphics Interchange Format (GIFs), etc. in relation to events detected in the livestreaming content. However, low network bandwidth and/or transmission issues may result in the viewer responses not reaching the content provider or the broadcaster in time, effectively hampering the integration of the remote viewer responses in the livestreaming content. Due to such technical limitations and shortcomings of conventional systems, most content providers only broadcast a live video feed with real-time commentary, which sometimes may not be engaging enough for content viewers.

Accordingly, there is a need to facilitate increased engagement for viewers of livestreaming content while overcoming the drawbacks of current livestreaming solutions. Further, it would be advantageous to enrich the livestreaming content in real-time to enhance the overall quality of experience provided to the content viewers.

SUMMARY

In an embodiment of the invention, a computer-implemented method for enriching livestreaming content for viewers is disclosed. The method detects, by a system, an event occurring within a livestreaming content. The livestreaming content is viewed by a plurality of viewers on respective electronic devices. The method determines, by the system, event data associated with the detected event based, at least in part, on one or more event attributes captured by one or more data sources associated with the livestreaming content. The method determines, by the system, an event type associated with the detected event based, at least in part, on the event data and a plurality of event profiles stored in an event database. The method identifies, by the system, at least one applause audio from among a plurality of pre-recorded applause audios stored at an applause repository based, at least in part, on the event type and the event data. The method adapts, by the system, the livestreaming content based, at least in part, on the at least one applause audio and an event status flag associated with the detected event to enrich the livestreaming content for the plurality of viewers.

In an embodiment of the invention, a system for enriching livestreaming content for viewers is disclosed. The system includes a memory and a processor. The memory stores instructions, that when executed by the processor, cause the system to detect an event occurring within a livestreaming content. The livestreaming content is viewed by a plurality of viewers on respective electronic devices. The system determines event data associated with the detected event based, at least in part, on one or more event attributes captured by one or more data sources associated with the livestreaming content. The system determines an event type associated with the detected event based, at least in part, on the event data and a plurality of event profiles stored in an event database. The system identifies at least one applause audio from among a plurality of pre-recorded applause audios stored at an applause repository based, at least in part, on the event type and the event data. The system adapts the livestreaming content based, at least in part, on the at least one applause audio and an event status flag associated with the detected event to enrich the livestreaming content for the plurality of viewers.

In another embodiment of the invention, a computer-implemented method for enriching livestreaming content for viewers is disclosed. The method detects, by a system, an event occurring within a livestreaming content. The livestreaming content is viewed by a plurality of viewers on respective electronic devices. The method determines, by the system, event data associated with the detected event based, at least in part, on one or more event attributes captured by one or more data sources associated with the livestreaming content. The method determines, by the system, an event type associated with the detected event based, at least in part, on the event data and a plurality of event profiles stored in an event database. The method compares the event data and the event type related to the event with a plurality of applause audio profiles associated with a plurality of pre-recorded applause audios stored at the applause repository and identifies at least one applause audio from among the plurality of pre-recorded applause audios based on the comparing step. The method adapts, by the system, the livestreaming content based, at least in part, on the at least one applause audio to enrich the livestreaming content for the plurality of viewers.

BRIEF DESCRIPTION OF THE FIGURES

The advantages and features of the invention will become better understood with reference to the detailed description taken in conjunction with the accompanying drawings, wherein like elements are identified with like symbols, and in which.

The drawings referred to in this description are not to be understood as being drawn to scale except if specifically noted, and such drawings are only exemplary in nature.

DETAILED DESCRIPTION

The best and other modes for carrying out the present invention are presented in terms of the embodiments, herein depicted in FIGS. 1 to 9. The embodiments are described herein for illustrative purposes and are subject to many variations. It is understood that various omissions and substitutions of equivalents are contemplated as circumstances may suggest or render expedient but are intended to cover the application or implementation without departing from the spirit or scope of the invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

Figure 1:
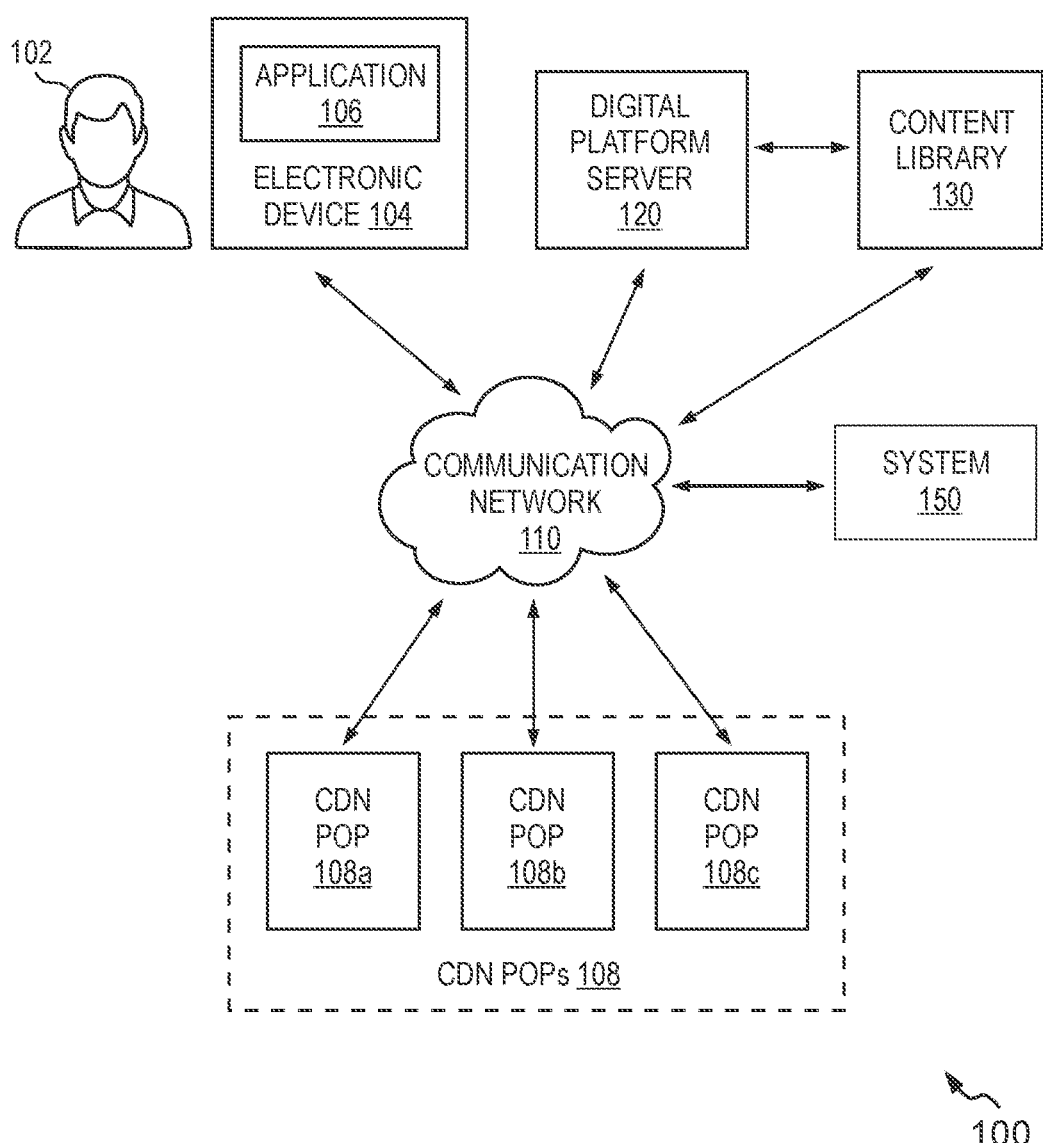
FIG. 1 is an example representation of an environment related to at least some example embodiments of the invention.

FIG. 1 is an example representation 100 of an environment related to at least some example embodiments of the invention. The example representation 100 depicts a viewer 102 controlling an electronic device 104 for viewing/accessing content offered by a streaming content provider.

The term 'streaming content provider' as used herein refers to an enterprise owner of digital video content libraries, which offers video content on a subscription basis by using a digital platform and over-the-top (OTT) media services, i.e. the video content is streamed over the Internet to the electronic devices of the subscribers. A streaming content provider is hereinafter referred to as a 'content provider' for ease of description. Though a content provider is not shown in FIG. 1, a digital platform server and a content library associated with a content provider are shown in the example representation 100 and explained in further detail later.

The content offered by the content provider may be embodied as streaming video content such as livestreaming content or on-demand video streaming content. Individuals wishing to view/access the content may subscribe to at least one type of subscription, such as a regular subscription or a premium subscription, offered by the content provider. Accordingly, the terms 'subscriber', 'viewer', 'content viewer' as interchangeably used herein may refer to a user of subscribed content, which is offered by the content provider.

The viewer 102 may have downloaded a software application 106 (hereinafter referred to as an 'application 106' or an 'app 106') corresponding to at least one content provider on the electronic device 104. It is noted that the viewer 102 may use one or more electronic devices, such as a smartphone, a laptop, a desktop, a personal computer, or any spatial computing device to view the content provided by the content provider. In one illustrative example, the viewer 102 may access a Web interface associated with the application 106 associated with a content provider on the electronic device 104. It is understood that the electronic device 104 may be in operative communication with a communication network 110, such as the Internet, enabled by a network provider, also known as an Internet Service Provider (ISP). The electronic device 104 may connect to the communication network 110 using a wired network, a wireless network, or a combination of wired and wireless networks. Some non-limiting examples of wired networks may include the Ethernet, the Local Area Network (LAN), a fiber-optic network, and the like. Some non-limiting examples of wireless networks may include the Wireless LAN (WLAN), cellular networks, Bluetooth or ZigBee networks, and the like.

The electronic device 104 may fetch the Web interface associated with the application 106 over the communication network 110 and cause the display of the Web interface on a display screen (not shown) of the electronic device 104. In an illustrative example, the Web interface may display a plurality of content titles corresponding to the content offered by the content provider to its viewers. The content may include livestreaming content (e.g., live concerts, professional sports games, etc.) and non-livestreaming content (e.g., video-on-demand, vlogs, etc.).

In an illustrative example, the viewer 102 may select a content title related to a live event (e.g., a sports match or a musical concert) from among the plurality of content titles displayed on the display screen of the electronic device 104. The selection of the content title may trigger a request for a playback Uniform Resource Locator (URL). The request for the playback URL is sent from the electronic device 104 via the communication network 110 to a digital platform server 120 associated with the content provider. The digital platform server 120 is configured to facilitate the streaming of the digital content to a plurality of viewers, such as the viewer 102.

In at least some embodiments, the digital platform server 120 includes at least one of a Content Management System (CMS) and a User Management System (UMS) for authenticating the viewer 102 and determining if the viewer 102 is entitled to view the requested content. To this effect, the digital platform server 120 may be in operative communication with one or more remote servers, such as an authentication server and an entitlement server. The authentication server and the entitlement server are not shown in FIG. 1. The authentication server may facilitate authentication of viewer account credentials using standard authentication mechanisms, which are not explained herein. The entitlement server may facilitate the determination of the viewer's subscription type (i.e. whether the viewer 102 has subscribed to regular or premium content) and status (i.e. whether the subscription is still active or is expired), which in turn may enable the determination of whether the viewer 102 is entitled to view/access the requested content or not.

The digital platform server 120 then identifies at least one Content Delivery Network (CDN) Point of Presence (PoP) which is in the proximity of the location of the viewer 102. As an illustrative example, three CDN PoPs such as a CDN PoP 108a, a CDN PoP 108b and a CDN PoP 108c, are depicted to be identified as CDN PoPs in the proximity of the location of the viewer 102 in FIG. 1. It is noted that the requested content may have been cached from the content library 130 of the content provider to the CDN PoPs 108a, 108b, and 108c (collectively, represented as CDN PoPs 108). Further, the digital platform server 120 identifies an optimal CDN PoP from among the CDN PoPs 108 for serving the viewer 102 with the requested content. The digital platform server 120 is configured to take into account, the location of the viewer, a content ID, performance metrics associated with the plurality of CDN PoPs 108a, 108b, and 108c, and one or more routing policies for determining the most optimal CDN for serving the requested content to the viewer 102.

In one illustrative example (not in accordance with example embodiments of the present disclosure), the viewer 102 may be an ardent cricket fan and may be watching livestreaming content of a cricket match being conducted at a remote cricket stadium on the electronic device 104. The cricket match may be devoid of intensity or any interesting moments during middle overs as the batsmen may mostly be defending balls and scoring only occasional singles. Additionally, the live commentary may be monotonous and unappealing. The viewer 102 may get bored and may decide to discontinue watching the livestreaming content. In some scenarios, the content provider may provide a chatroom option to its viewers and the viewer 102 may avail of the chat-room option to maintain interest. However, if other viewers have discontinued watching the live broadcast due to the uninteresting nature of the current broadcast, or, in general, if there are very few viewers watching the live broadcast, then the viewer 102 may not be able to keep himself engaged during such passages in the play using the chat-room option. In some scenarios, the content provider may provide an option to the viewer 102 to share emoticons, animated Graphics Interchange Format (GIFs), etc. in relation to events occurring in the livestreaming content. However, low network bandwidth and/or transmission issues may result in the viewer's response not reaching the content provider or the broadcaster in time, effectively hampering the integration of the viewer's response with the livestreaming content. Due to such technical limitations and shortcomings of conventional systems, most content providers only broadcast a live video feed with real-time commentary, which sometimes may not be engaging enough for viewers.

To overcome the aforementioned drawbacks and provide additional advantages, a system 150 is disclosed for enriching the livestreaming content for viewers. The system 150 is configured to detect the occurrence of an event in the livestreaming content and identify applause audio, which is most appropriate to the detected event. The livestreaming content is adapted based on the applause audio (i.e., combined with the livestreaming content) in substantially real-time to enrich the livestreaming content. In the illustrative example mentioned above, the system 150 may be capable of detecting an occurrence of a dull or an uninteresting period during the cricket game and identifying an applause audio, such as a rhythmic drumming sound building to a crescendo to show buildup to an upcoming event like scoring a goal or hitting a four or a six. The identified applause audio may be included in the livestreaming content at appropriate moments (such as when the bowler is about to deliver the ball or when the player has entered the 'D' area in a football game) to provide another interesting audio (over the dull live commentary) to keep the viewer engaged. Further, if the player scores a boundary, then an applause audio, such as a clapping sound interspersed with hooting may be combined with the livestreaming content to make the livestreaming content more interesting and keep the viewer 102 engaged. In another illustrative example, an applause audio embodied as a rhythmic clapping sound may be included in livestreaming content associated with a live musical performance show to provide an 'at-venue' experience to the viewers. The system 150 is explained in further detail with reference to FIG. 2.

Figure 2:
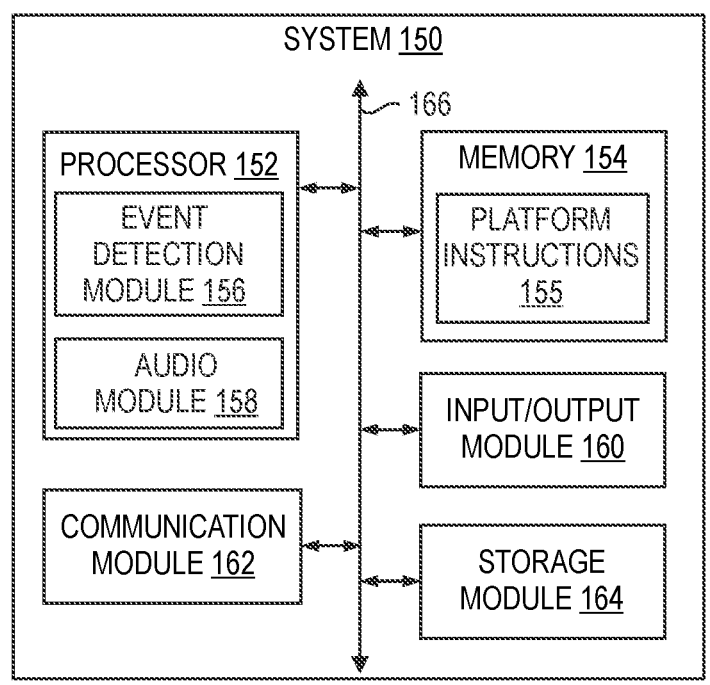
FIG. 2 is a block diagram of a system configured to enrich livestreaming content for content viewers, in accordance with an embodiment of the invention.

FIG. 2 is a block diagram of the system 150 configured to enrich livestreaming content for content viewers, in accordance with an embodiment of the invention. The system 150 may be implemented in a server accessible over the communication network 110 (shown in FIG. 1). For example, the system 150 may be implemented in one or more computing devices as a part of a server entity and may be in operative communication with the digital platform server 120 (shown in FIG. 1). Alternatively, in at least some embodiments, the system 150 may be implemented within the digital platform server 120.

The system 150 includes at least one processor, such as a processor 152 and a memory 154. It is noted that although the system 150 is depicted to include only one processor, the system 150 may include a greater number of processors therein. In an embodiment, the memory 154 is capable of storing machine-executable instructions, referred to herein as platform instructions 155. Further, the processor 152 is capable of executing the platform instructions 155. In an embodiment, the processor 152 may be embodied as a multi-core processor, a single-core processor, or a combination of one or more multi-core processors and one or more single-core processors. For example, the processor 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, or the like. In an embodiment, the processor 152 may be configured to execute hard-coded functionality. In an embodiment, the processor 152 is embodied as an executor of software instructions, wherein the instructions may specifically configure the processor 152 to perform the algorithms and/or operations described herein when the instructions are executed.

The processor 152 is depicted to include an event detection module 156 and an audio module 158. The event detection module 156 and the audio module 158 may be implemented as hardware, software, firmware, or combinations thereof. The event detection module 156 and the audio module 158 are explained in further detail later.

The memory 154 may be embodied as one or more volatile memory devices, one or more non-volatile memory devices, and/or a combination of one or more volatile memory devices and non-volatile memory devices. For example, the memory 154 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read-only memory), CD-R (compact disc recordable), CD-R/W (compact disc rewritable), DVD (Digital Versatile Disc) and BD (BLU-RAY® Disc).

In at least some embodiments, the memory 154 stores logic and/or instructions, which may be used by modules of the processor 152, such as the event detection module 156 and the audio module 158. For example, the memory 154 includes logic and/or instructions for: (1) analyzing one or more data sources related to a livestreaming content for detecting an event occurring within the livestreaming content, (2) determining event data associated with the detected event, (3) determining an event type associated with the detected event, (4) identifying at least one applause audio from among a plurality of pre-recorded applause audios, (5) determining a value of an event status flag associated with the detected event, and (6) combining the at least one applause audio with the livestreaming content to generate an enriched livestreaming content.

The term 'enriched livestreaming content' as used herein refers to adapting the livestreaming content based on the applause audio. More specifically, audio mixing, i.e. adjusting and combining (or blending) multiple audio signals into a single audio is performed for enriching the livestreaming content. In general, the applause audio in relation to the event (i.e., identified from an applause repository) is combined with a corresponding audio portion of the livestreaming content to generate the enriched livestreaming content. In one illustrative example, a captain of a cricket match may win a toss which may be detected as an event. Accordingly, an applause audio corresponding to the event (i.e., a captain winning the toss) may be selected and combined with a corresponding audio portion of the livestreaming content, for example, an audio portion in which the winning captain discloses a choice of innings i.e., batting/bowling first on a pitch. The enriched livestreaming content is configured to improve the quality of experience provided to viewers by making the livestreaming content more interesting for the viewers.

The system 150 further includes an input/output module 160 (hereinafter referred to as an 'I/O module 160') and at least one communication module such as a communication module 162. In an embodiment, the I/O module 160 may include mechanisms configured to receive inputs from and provide outputs to the operator(s) of the system 150. To that effect, the I/O module 160 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light-emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 152 may include I/O circuitry configured to control at least some functions of one or more elements of the I/O module 160, such as, for example, a speaker, a microphone, a display, and/or the like. The processor 152 and/or the I/O circuitry may be configured to control one or more functions of the one or more elements of the I/O module 160 through computer program instructions, for example, software and/or firmware, stored on a memory, for example, the memory 154, and/or the like, accessible to the processor 152.

The communication module 162 may include communication circuitry such as for example, a transceiver circuitry including an antenna and other communication media interfaces to connect to a communication network, such as the communication network 110 shown in FIG. 1. The communication circuitry may, in at least some example embodiments enable reception of: (1) livestreaming content from remote entities, such as, the content library 130 (shown in FIG. 1) or from the event venues, (2) real-time sensor data (i.e., sensor inputs) received from event venues, and (3) scorecard in case of professional sports/games. The communication circuitry may further be configured to enable transmission of the enriched livestreaming content to the CDN PoPs 108 or directly to the subscribers (e.g., the viewer 102).

The system 150 is further depicted to include a storage module 164. The storage module 164 is any computer-operated hardware suitable for storing and/or retrieving data. In one embodiment, the storage module 164 includes an applause repository (shown as applause repository 408 in FIG. 4), which is configured to store a large variety of pre-recorded applause audios associated with live events. The term 'applause audio' as used herein refers to audio signals representative of the act of clapping or striking palms together for creating sounds indicating approval, praise, elation, enjoyment, or cheering for an event in the livestreaming content. For example, an electronic representation of clapping sound (i.e., synthesized or automated applauding sound or pre-recorded applauding sound) may configure the applause audio corresponding to the detected event. Further, each applause audio may be associated with an applause audio profile that defines the characteristics/attributes of the corresponding applause audio. For example, the applause audio profile defines a type of livestreaming content, event type, duration of the applause audio, the rhythm of the applause audio, and the like associated with the applause audio.

In one illustrative example, the applause repository may include an applause audio in the form of a clapping sound interspersed with hooting to mimic an event, such as scoring a goal in a football match, taking a wicket in a cricket game, or winning a set in a tennis match, and the like. In another illustrative example, the applause repository may include an applause audio in the form of a thunderous clapping sound, typically associated with a standing ovation, when a musical performance is completed. In yet another illustrative example, the applause repository may include an applause audio in the form of a sound configured to mimic the song being sung by a live performer. As such, the applause repository may serve as a database of applauses/sounds for a variety of events in live performances related to professional sports games, individual or group performances related to theatre, music, dance or radio, entertainment shows, etc. that may be streamed in real-time.

In one embodiment, the storage module 164 includes an event database 320, which is configured to store a plurality of event profiles associated with live events. Typically, an event profile includes a plurality of event attributes defining a corresponding event. More specifically, the plurality of event attributes defines a set of expected behavior or sequence of actions in relation to the occurrence of an event. For example, an event profile for an event related to a batsman hitting a ball for SIX runs may be associated with event attributes that define an expected sequence of actions, such as a ball crossing the boundary, the umpire signaling a SIX, the score increasing by six runs in one ball and the crowd cheering the shot. Such information may configure the event profile for the event related to a batsman hitting a ball for SIX runs. A number of such events in relation to each type of sport, each type of live show, etc., may be predefined and respective event profiles configured for each of the respective predefined events are stored in the event database 320. The creation of events and/or event profiles may be performed manually by an operator of the system 150 using the I/O module 160, or, learned using a machine learning algorithm stored in the memory 154 of the system 150. The storage module 164 may include multiple storage units such as hard drives and/or solid-state drives in a redundant array of inexpensive disks (RAID) configuration. In some embodiments, the storage module 164 may include a storage area network (SAN) and/or a network-attached storage (NAS) system. In one embodiment, the storage module 164 may correspond to a distributed storage system, wherein individual databases are configured to store custom information, such as viewer logs for various livestreaming content.

In some embodiments, the processor 152 and/or other components of the processor 152 may access the storage module 164 using a storage interface (not shown in FIG. 2). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 152 and/or the modules of the processor 152 with access to the storage module 164.

The various components of the system 150, such as the processor 152, the memory 154, the I/O module 160, the communication module 162, and the storage module 164 are configured to communicate with each other via or through a centralized circuit system 166. The centralized circuit system 166 may be various devices configured to, among other things, provide or enable communication between the components of the system 150. In certain embodiments, the centralized circuit system 166 may be a central printed circuit board (PCB) such as a motherboard, a mainboard, a system board, or a logic board. The centralized circuit system 166 may also, or alternatively, include other printed circuit assemblies (PCAs) or communication channel media.

In at least one example embodiment, the communication module 162 is configured to receive video signals corresponding to a livestreaming content (i.e., real-time event broadcast). For example, the communication module 162 may receive video signals corresponding to a musical concert, i.e. real-time video feed of a live musical performance conducted at an event venue. In addition to receiving the video signals corresponding to the livestreaming content, the communication module 162 may also receive sensor data and scorecard information from the event venue. The sensor data from the event venue may be captured using a plurality of sensors deployed at multiple locations within the event venue. For example, audio sensors from the event venue may capture spectator chants and slogans among other sounds associated with the hosting of the live event at the event venue. Similarly, touch sensors in articles involved in the game, such as the stumps, netting in the tennis court, player equipment, etc., may also be received by the communication module 162 from the event venue.

The communication module 162 may be configured to forward the video signals corresponding to the livestreaming content, the sensor data (i.e., sensor inputs), and the scorecard from the event venue to the processor 152. The modules of the processor 152 in conjunction with the instructions stored in the memory 154 may be configured to process such inputs to adapt the livestreaming content, i.e. video signals interspersed with applause audio in response to detected events in the livestreaming content. The processing of inputs by the event detection module 156 of the processor 152 is explained next with reference to FIG. 3.

Figure 3:
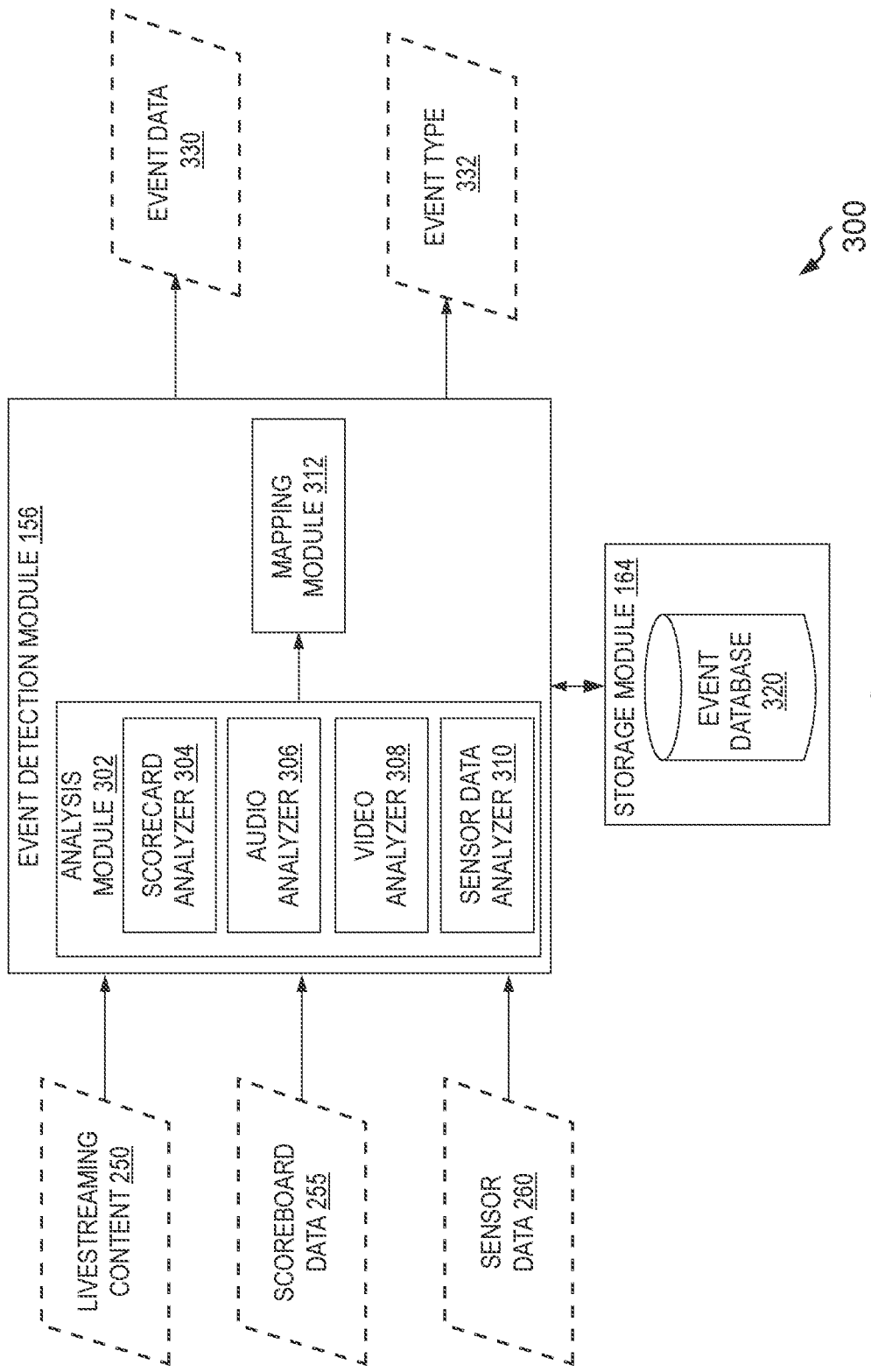
FIG. 3 shows a block diagram of an event detection module of the system of FIG. 2 for illustrating detection of events in livestreaming content, in accordance with an embodiment of the invention.

FIG. 3 shows a block diagram 300 of the event detection module 156 for illustrating the detection of events in livestreaming content 250, in accordance with an embodiment of the invention. As explained with reference to FIG. 2, the event detection module 156 is configured to receive a livestreaming content 250 (i.e. real-time broadcast data), a scoreboard data 255, and sensor data 260 to detect the occurrence of events in the livestreaming content 250.

The event detection module 156 is depicted to include an analysis module 302 and a mapping module 312. In at least one embodiment, the analysis module 302 in the event detection module 156 is configured to analyze the livestreaming content 250 for spotting the occurrence of predefined changes, predefined actions, sudden changes in audio/video intensity, anomalous change in expected event flow, and the like. More specifically, the event detection module 156 is configured to track one or more data sources associated with the livestreaming content 250 to detect events unfolding in the livestreaming content 250. The one or more data sources include at least one of: audio signals, visual signals, scorecard, and sensor data 260 associated with the livestreaming content 250. For example, during a livestreaming content such as a football game, (1) when points are scored, an event may be indicated; (2) when a gain of yardage beyond a predetermined amount is gained, an event may be indicated; (3) when a first down is made, an event may be indicated; etc.

To that effect, the analysis module 302 is depicted to include a scorecard analyzer 304, an audio analyzer 306, a video analyzer 308, and a sensor data analyzer 310. The analyzers 304, 306, 308, and 310 of the analysis module 302 may be trained to operate independently, in parallel, or in collaboration with each other, to spot the occurrence of predefined changes, predefined actions, sudden changes in audio/video intensity, anomalous change in expected event flow, and the like. It is noted that the analysis module 302 may include more or fewer components than those depicted herein. Further, the analysis module 302 may only use some of the analyzers for analyzing the livestreaming event 250 and the sensor data 260 based on the type of live event or live program. For example, for analyzing the livestreaming content 250 corresponding to a live musical concert, the analysis module 302 may not use the scorecard analyzer 304.

The scorecard analyzer 304 is configured to continuously track the scoreboard data 255 of a scorecard corresponding to a live match to spot the occurrence of predefined changes or anomalous changes in expected event flow in the livestreaming content 250 associated with a live program. As an example, in the game of football, a predefined change may be an increase in the score of a participating team, which is indicative of the team scoring a goal. Similarly, in the case of cricket, a predefined change may be the score progressing by four or six runs in one ball, which is indicative of a batsman hitting a FOUR or a SIX. Another predefined change may be an increase in the column representing the fall of wickets, which is indicative of a bowler getting a batsman OUT. In yet another example, in the game of tennis, the reaching of 6 (or seven games) may be a predefined change, indicative of a player winning a set.

An example of the anomalous change in the expected event flow may include a stalled scorecard in a cricket or a tennis game, which is indicative of rain or some other form of stoppage during a live game. Accordingly, a stalled scorecard may be an example of an anomalous change in the expected event flow. The removal of a player's name in the scorecard without substitution in a football game may be indicative of a red card, and such an event may be predefined as an anomalous change in the expected event flow.

Accordingly, the scorecard analyzer 304 is configured to track the scorecard data 255 from scorecards or scoreboards to spot the occurrence of predefined changes or an anomalous change in the expected event flow during livestreaming of content associated with a live program. On spotting an occurrence of a predefined change or on spotting the occurrence of an anomalous change in the expected event flow, the scorecard analyzer 304 is configured to provide the information related to the spotted occurrence to the mapping module 312. For example, if scorecard analyzer 304 spots an occurrence of an increase in the score of a team participating in the football match, which is indicative of the team scoring a goal, then the scorecard analyzer 304 is configured to provide the information related to the increase in the score to the mapping module 312.

The audio analyzer 306 is configured to track audio signals associated with the livestreaming content 250 to spot the occurrence of a sudden change in audio intensity. For example, a drastic change in pitch or tone of a commentator during a football match may indicate that a goal has been scored. Accordingly, a sudden change in audio intensity of the commentator or the crowd may indicate that a goal-scoring event has occurred. Similarly, a sudden change in the audio intensity of the audience during a live musical performance may indicate that a popular song is being played. In yet another example, the sudden change in audio intensity may also signal the arrival of players in the stadium or the completion of a game. On spotting an occurrence of a sudden change in the audio intensity, the audio analyzer 306 may be configured to provide the information related to the spotted occurrence to the mapping module 312. For example, if audio analyzer 306 spots an occurrence of a sudden change in the audio intensity, which is indicative of the team scoring a goal, then the audio analyzer 306 is configured to provide the information related to the change in the audio intensity to the mapping module 312.

The video analyzer 308 is configured to perform scene analysis of the visual signals in the livestreaming content 250 in substantially real-time to spot the occurrence of predefined actions, sudden changes in intensity, or occurrence of an anomalous change in the expected event flow. For example, the signaling of a wide ball/no-ball/four/six or a wicket by an umpire in a cricket game, or a player celebrating a milestone such as a century or a double century may be stored as predefined actions. Similarly, the football touching the netting of the goalpost from inside may be stored as a predefined action, which is indicative of scoring a goal. Similarly, the signaling of a yellow card or a red card by a referee may be stored as a predefined action. Such predefined actions may be spotted during scene analysis of the livestreaming content 250.

Further, the scene analysis by the video analyzer 308 may also enable spotting the occurrence of anomalous events, such as players retreating due to a stoppage in a game, injury to a player, etc. Furthermore, the scene analysis by the video analyzer 308 may also enable spotting the occurrence of a change in intensity, such as a visible change in the body language of players/live performers, the change in the pace of action (for example, a counterattacking play in football, or a tie-breaker event in tennis, a hat-trick in cricket, etc.), and the like. On spotting an occurrence of a predefined action, a sudden change in intensity, or an anomalous change in the expected event flow, the video analyzer 308 may be configured to provide the information related to the spotted occurrence to the mapping module 312.

The sensor data analyzer 310 is also configured to track the sensor data 260 received from the event venue to spot the occurrence of predefined changes. For example, a ball hitting the stumps may be stored as a predefined change, which is indicative of a fall of a wicket. The occurrence of such a predefined change may be spotted in data received from sensors installed in the stumps. Similarly, a shuttle cock landing on a tram line may be stored as a predefined change, which is indicative of a point won or lost. The occurrence of such a predefined change may be spotted in data received from sensors installed in tramlines on a badminton court. On spotting an occurrence of a predefined change, the sensor data analyzer 310 may be configured to provide the information related to the spotted occurrence to the mapping module 312.

The mapping module 312 is configured to use the information related to the spotted occurrence from one or more analyzers and identify/validate the occurrence of an event in the livestreaming content 250. In one illustrative example, the mapping module 312 may receive information related to the spotted occurrence of an increase in the score of a team in a football game received from the scoreboard analyzer 304, information related to the spotted occurrence of an increase in audio intensity during the football game from the audio analyzer 306, information related to the spotted occurrence of players celebrating an event during the football game from the video analyzer 308, and information related to the spotted occurrence of the football touching the inside netting of a goal post during the football game from the sensor data analyzer 310. The mapping module 312 may collate such information (also referred to herein as 'event attributes') received from one or more analyzers and compare the one or more event attributes with corresponding event attributes of each event profile of the plurality of event profiles in the event database 320 to determine an event type 332 associated with the detected event (i.e., an event of scoring of a goal has occurred). The term 'event type' defines the nature of the detected event. For example, in a live cricket match, a batsman scoring fifty runs may be categorized as an event type (e.g., batsman hitting half-century). Similarly, the mapping module 312 is configured to determine the event type 332 in other games, live performance shows, etc., by collating information from one or more analyzers and comparing the collated information with the plurality of event profiles in the event database 320. It shall be noted that the event data 330 includes information related to the event whereas the event type 332 specifically defines the type of the event in the livestreaming content.

Upon detecting the occurrence of an event, the mapping module 312 of the event detection module 156 may provide information related to the detected event to the audio module 158. The information related to the detected event is hereinafter referred to as 'event data' (shown as event data 330 in FIG. 3) and may include one or more event attributes such as an identification of the livestreaming content 250, key performers related to the event, event timestamp, expected duration of the event and event expiry time duration and information related to the event. In addition, the event type 332 associated with the detected event is also provided to the audio module 158. The processing of the event data 330 and the event type 332 by the audio module 158 is explained next with reference to FIG. 4.

Figure 4:
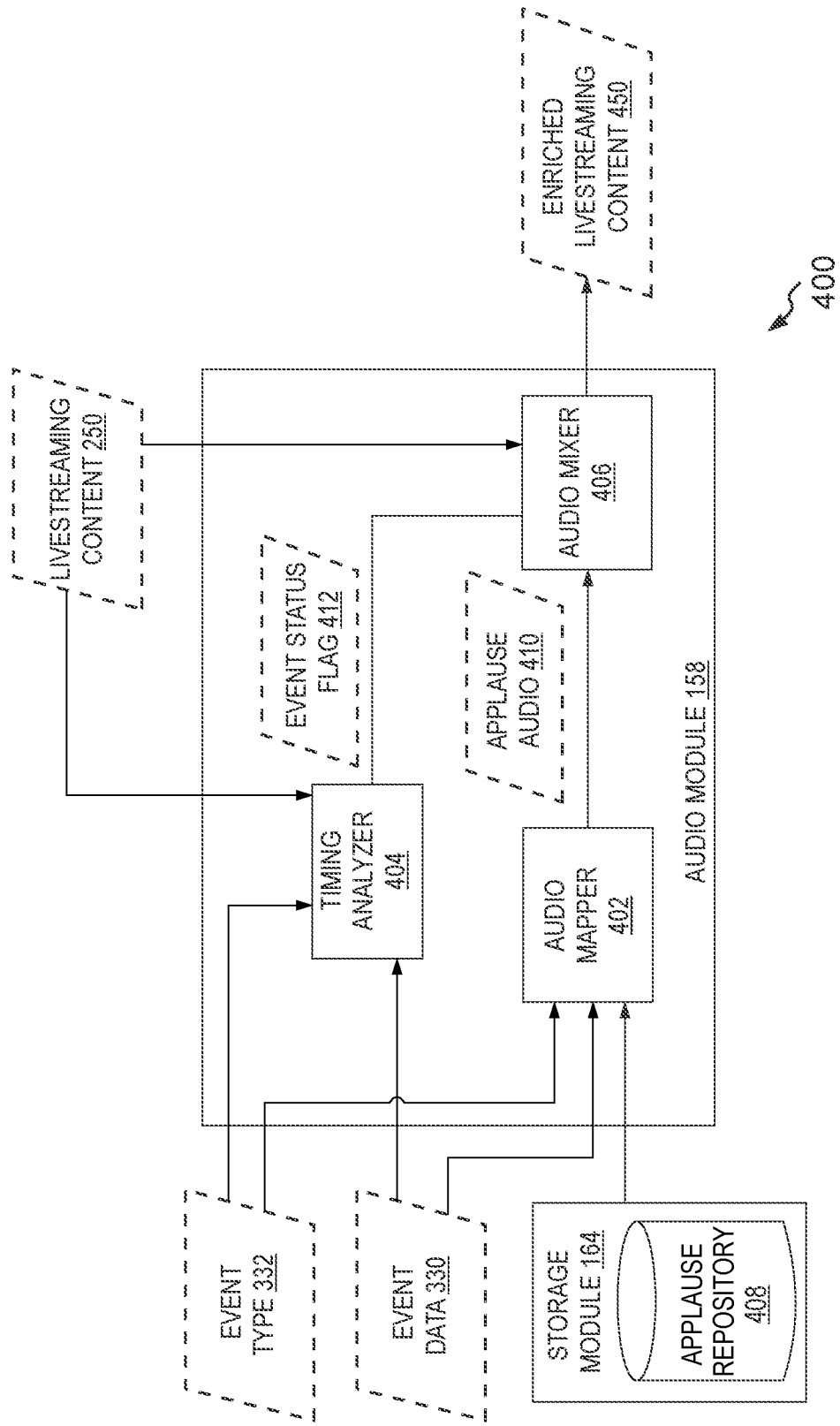
FIG. 4 shows a block diagram of an audio module of the system of FIG. 2 for illustrating the generation of enriched livestreaming content, in accordance with an embodiment of the invention.

FIG. 4 shows a block diagram 400 of the audio module 158 for illustrating the generation of enriched livestreaming content 450, in accordance with an embodiment of the invention. The audio module 158 is depicted to include an audio mapper 402, a timing analyzer 404, and an audio mixer 406. As explained with reference to FIG. 3, the event detection module 156 is configured to provide the event data 330 to the audio module 158. The event data 330 and the event type 332 may be received by the audio mapper 402 and the timing analyzer 404 of the audio module 158.

The audio mapper 402 is configured to compare the event data 330 and the event type 332 with a plurality of applause audio profiles in the applause repository 408. Though the applause repository 408 is depicted to be a part of the storage module 164, in some embodiments, the applause repository 408 may be implemented in a remote server entity, which is in operable communication with the storage module 164 and the audio module 158.

In one illustrative example, if the performer dances for a song in a live performance, the event data 330 related to such a live program may include information, such as event type of the live program (i.e. live dance performance), type of song to which the performer danced (for example, song name, genre, etc.), type of dance performed, and the like. Based on the event data 330 and the event type 332, the audio mapper 402 may be configured to identify an applause audio that is most suitable for the live dance performance. As explained with reference to FIG. 2, the applause repository 408 may store a variety of applause audios in relation to different live events, such as events related to various professional sports games, theatrical performances, live shows, etc., and examples of such applause audios are not explained again herein. The applause audio, retrieved from the applause repository 408 based on the event data 330 and the event type 332, is shown as applause audio 410 in FIG. 4.

The timing analyzer 404 is also configured to receive the event data 330 and perform a timing analysis to determine if the detected event has expired or not. More specifically, the timing analyzer 404 determines a value of an event status flag associated with the detected event based on the event data. For example, each event may be associated with a time duration (usually a few seconds time duration) after which the event may expire. Accordingly, the timing analyzer 404 may be configured to compare a time of difference or time elapsed between a current timestamp and an event occurrence timestamp with an event expiry time duration associated with the detected event. The value of the time of difference may be compared with the time duration associated with the event expiry to determine the value of the event status flag (i.e., status of the detected event). Accordingly, the event status flag is assigned at least one of: a first value indicating an active status of the detected event and a second value indicating an expired status of the detected event. If the time elapsed is lesser than or equal to an event expiry time duration, then, the status of the event is active and if the time elapsed is greater than the event expiry time duration, then the status of the event is expired. In an embodiment, the timing analyzer 404 may assign the value to the event status flag 412, which may indicate whether the event has expired or not. For example, if the event is active, then the event status flag 412 may be assigned the first value indicating the active status of the detected event and when the detected event has expired, then the event status flag 412 may be assigned the second value indicating the expired status of the detected event. The timing analyzer 404 is configured to provide the event status flag 412 to the audio mixer 406.

In addition to receiving the event status flag 412 from the timing analyzer 404, the audio mixer 406 also receives the applause audio 410 from the audio mapper 402 and the livestreaming content 250. In at least one embodiment, the audio mixer 406 is configured to perform audio mixing, i.e. adjusting and combining (or blending) multiple audio signals into a single audio. During audio mixing, one or more audio parameters (i.e., volume level, rhythm, and intensity) of the audio signals are manipulated or enhanced based on the context of the detected event. For example, if the detected event is a farewell event for a distinguished player, then the applause audio may be associated with higher volume levels as compared to the applause audio selected for events, such as the arrival of players at the event venue or at the completion of the game. Accordingly, in one embodiment, the audio mixer 406 is configured to audio-mix or combine the audio signals corresponding to applause audio 410 with a corresponding portion of the livestreaming content 250 if the event has not expired (as indicated by the event status flag 412) to generate an enriched livestreaming content 450. In other words, the livestreaming content 250 is adapted based on the applause audio 410 for enriching the livestreaming content 250. The audio mixing of the livestreaming content 250 with the applause audio 410 is performed in such a manner, such that the applause audio 410 serves as a background sound of the livestreaming content 250. More specifically, the livestreaming content 250 may still include original audio such as but is not limited to live commentary, live spectator sounds, cheering sounds and/or sound of players' voices in a professional sports game, and/or the sound of musical instruments, live performers' voices, and audience cheering sounds in live performances. Such original audio of the livestreaming content 250 is mixed with the applause audio 410 to generate an enriched livestreaming content 450 for the content viewers. More specifically, the audio module 158 performs audio mixing of the original video with the applause audio 410 to generate the enriched livestreaming content 450 that is configured to capture the attention of the content viewers, thereby keeping them engaged, and ensuring a feeling of attending the live event for the content viewer.

It is noted that if the event has expired (as indicated by the event status flag 412), then the applause audio 410 is not combined with the livestreaming content 250 and the viewer, in such a case, is only presented with the livestreaming content 250. In one illustrative example, a bowler in a cricket game may celebrate claiming a wicket of a batsman for a time duration within which the applause audio 410 needs to be played back with the livestreaming content 250. If the time duration has elapsed and the bowler is about to deliver his next ball, then the applause audio 410 is not combined with the livestreaming content 250. It is noted that the processing of the livestreaming content 250 is explained herein with reference to a single event detected in the livestreaming content 250. However, it is understood that other events in the livestreaming content 250 may be processed similarly to generate the enriched livestreaming content 450 for viewers in real-time.

Figure 5:
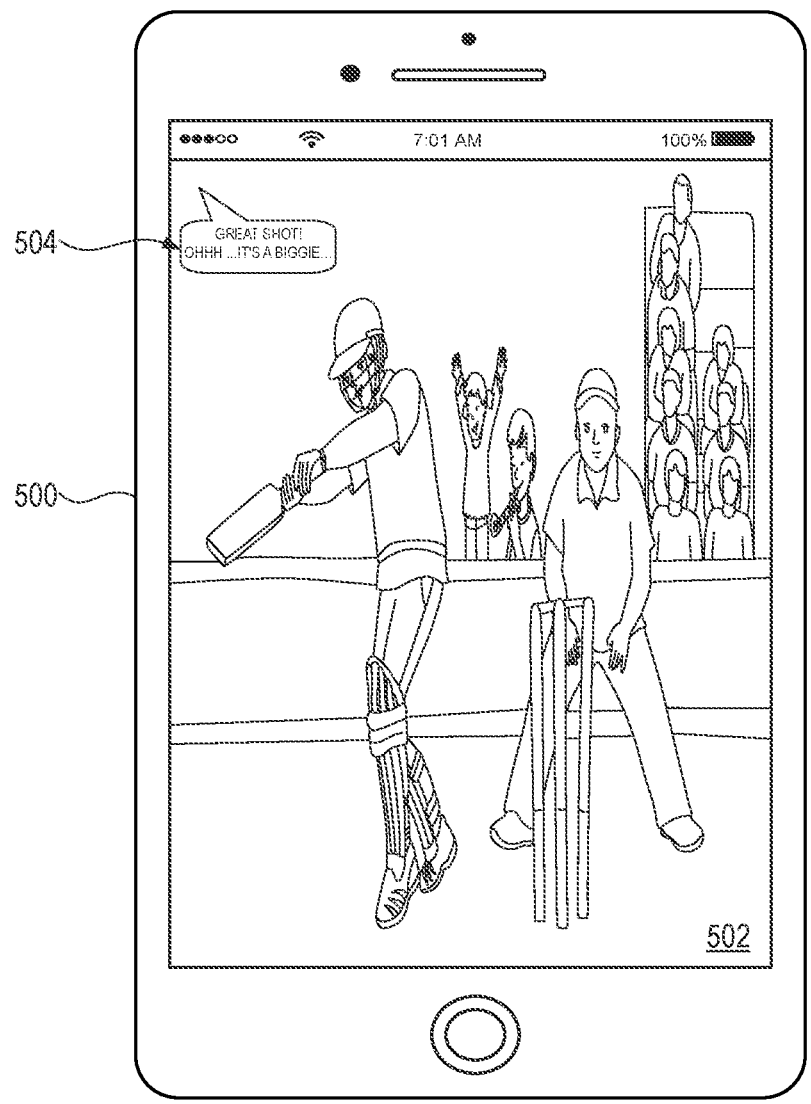
FIG. 5 shows an electronic device displaying a UI of an application of a content provider showing livestreaming content corresponding to a cricket game, in accordance with an embodiment of the invention.

Referring now to FIG. 5, an electronic device 500 displaying a UI 502 of an application of a content provider (such as the application 106 shown in FIG. 1) showing livestreaming content corresponding to a cricket game is depicted, in accordance with an embodiment of the invention. More specifically, the UI 502 depicts a batsman smacking the ball hard and the ball flying towards the boundary rope. The livestreaming content may be associated with audio, such as live commentary, in relation to the cricket game. Accordingly, the UI 502 is exemplarily depicted to show a speech bubble 504 corresponding to a voice input of a commentator. As an example, the speech bubble 504 is exemplarily depicted to be associated with the text 'GREAT SHOT! OHHH . . . IT'S A BIGGIE . . . . ' corresponding to a voice input of a commentator. It is noted that the audio associated with the livestreaming content may not be limited to the textual content shown in the speech bubble 504, or even, audio commentary associated with the football game. Indeed the audio associated with the livestreaming content may include other sounds heard in a stadium where the cricket match is played such as, but not limited to, spectator cheering sounds, player voices, umpire announcements, etc.

As explained with reference to FIG. 3, the various analyzers such as the scorecard analyzer 304, the audio analyzer 306, the video analyzer 308, and the sensor data analyzer 310 may detect an event based on identifying the occurrence of a predefined change/action and a sudden change in audio/video intensity. The mapping module 312 may receive the inputs from the analyzers and detect that an event type of the batsman hitting the ball for a SIX has taken place, and provide the event data 330 to the audio module 158. The audio module 158 may use the event data 330 (i.e. data related to the event of the batsman hitting the ball for a SIX) to identify an appropriate or matching applause audio. Further, the timing analyzer 404 (shown in FIG. 4) may perform an analysis of whether the event has expired based on the livestreaming content. If the event is not over (as indicated by the event status flag), the applause audio is combined (or audio-mixed) with the livestreaming content to provide enriched livestreaming content to the viewer as exemplarily shown in FIG. 6.

Figure 6:
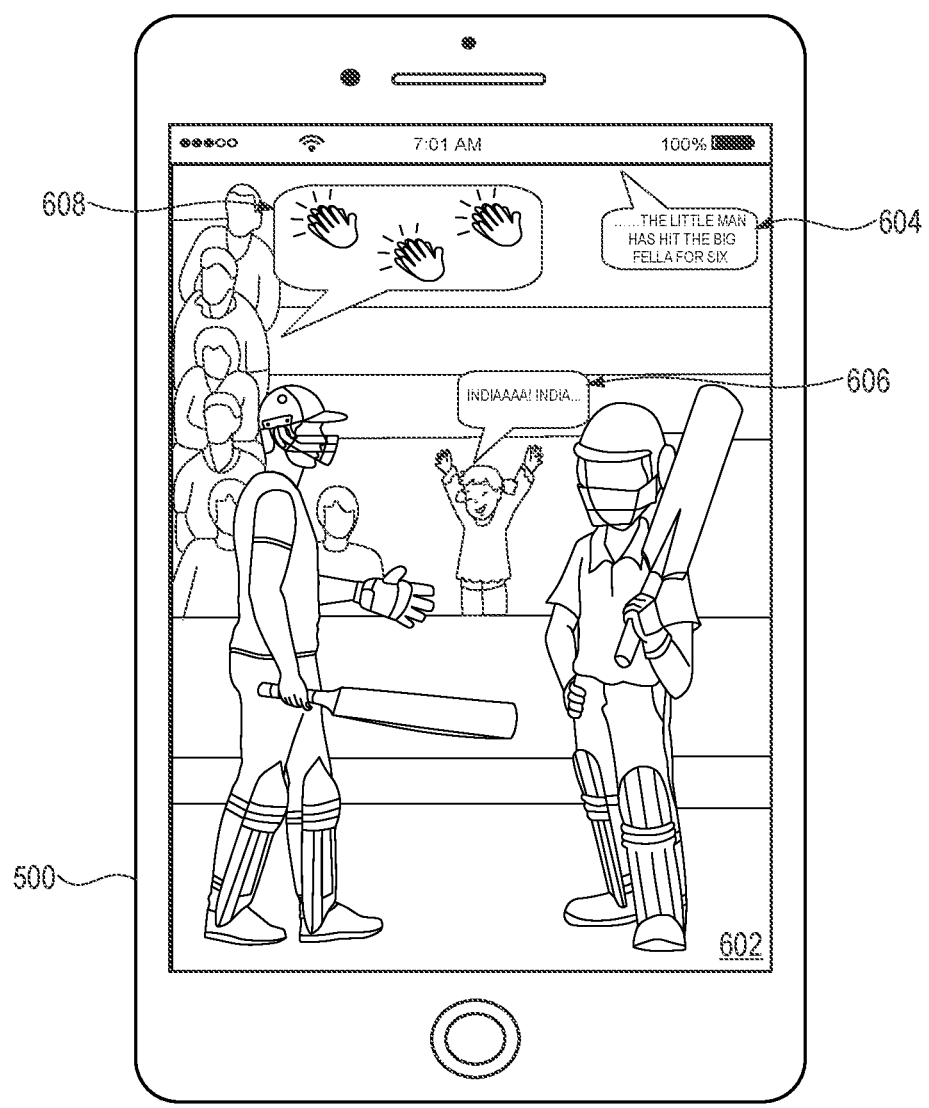
FIG. 6 shows the electronic device of FIG. 5 displaying a UI of the application of the content provider showing enriched livestreaming content corresponding to the cricket game, in accordance with an embodiment of the invention.

FIG. 6 depicts the electronic device 500 displaying a UI 602 of an application of a content provider (such as the application 106 shown in FIG. 1) showing enriched livestreaming content corresponding to a cricket game, in accordance with an embodiment of the invention.

As explained with reference to FIG. 4, the livestreaming content is enriched with an applause audio to generate an enriched livestreaming content. Accordingly, the UI 602 displays the video associated with livestreaming content that is associated with an original audio of the livestreaming content combined with an applause audio. The original audio of the livestreaming content may include live commentary, as shown in a speech bubble 604. For example, a voice input of a commentator of the cricket match is shown in the speech bubble 604 as " . . . THE LITTLE MAN HAS HIT THE BIG FELLA FOR SIX". A chant from a spectator is also exemplarily shown in a speech bubble 606 as "INDIAAAA! INDIA . . . !".

As explained with reference to FIG. 4, the timing analyzer 404 of the audio module 158 checks whether the event of the batsman hitting a SIX is expired or not. Further, as explained with reference to FIG. 4, a time duration is stored for each event as a reference for checking whether the event has expired or not. For example, the event of the batsman hitting a SIX may be associated with a duration of three seconds. The timing analyzer 404 may compare the current timestamp with the timestamp of the event (provided along with the event data 330) to determine whether the event has expired or not. Accordingly, the timing analyzer 404 may assign a value to the event status flag based on the status of the detected event. If the event is still active as indicated by the event status flag (i.e., the event status flag is assigned a first value to indicate the active status of the detected event), the applause audio is combined with the livestreaming content and the enriched livestreaming content is provided to the viewer, as shown using an audio bubble 608 in the UI 602. More specifically, the audio bubble 608 includes real-time applause audio synthesized based on the event type and the event data associated with the detected event of the batsman hitting a ball for a SIX. Alternatively, if the event has expired as indicated by the event status flag (e.g., the batsman has taken his stand and the bowler is ready to bowl the next delivery), the applause audio is not combined with the livestreaming content. In at least one example embodiment, audio parameters of the applause audio may also be adapted dynamically based on number of viewers currently viewing the livestreaming content, or, based on an event context.

Figure 7:
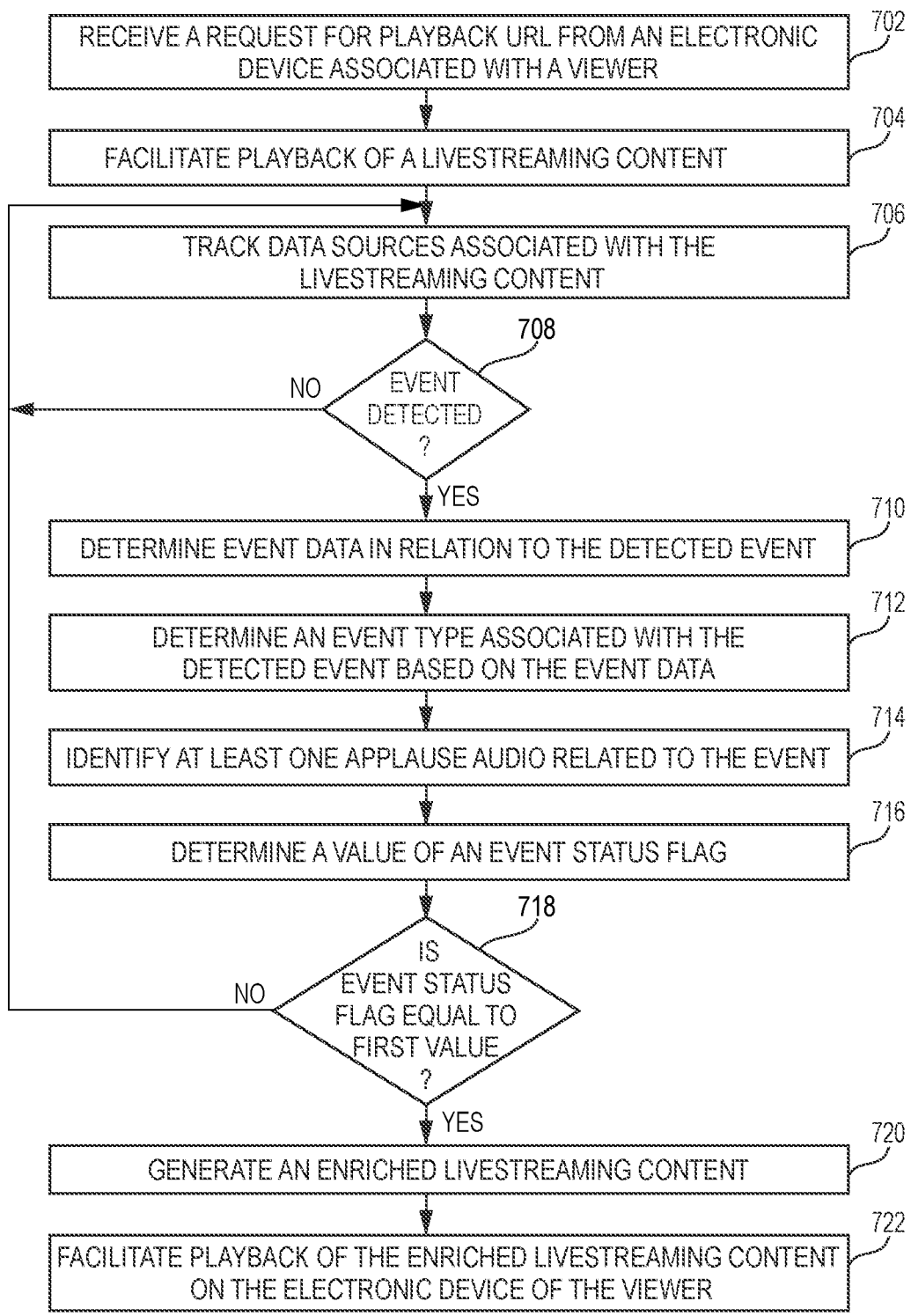
FIG. 7 shows a flow diagram of a method for providing enriched livestreaming content to content viewers, in accordance with an embodiment of the invention.

FIG. 7 shows a flow diagram of a method 700 for providing enriched livestreaming content to content viewers, in accordance with an embodiment of the invention. The method 700 starts at 702.

At 702, a request for playback URL is received from an electronic device associated with a viewer (e.g., viewer 102) by a system such as, the system 150 explained with reference to FIGS. 1-6. For example, the viewer may select a livestreaming content associated with a content title among a plurality of content titles displayed on a display screen of the electronic device which triggers the request for the playback URL.

At 704, the system 150 facilitates playback of the livestreaming content. More specifically, the digital platform server 120 authenticates the viewer and determines if the viewer is entitled to view the livestreaming content. On account of being operably coupled with the digital platform server 120, the system 150 facilitates playback of the livestreaming content for the viewer after authenticating identity of the viewer.

At 706, data sources associated with the livestreaming content are tracked. Some examples of the data sources related to the livestreaming content include, but are not limited to, audio signals associated with the livestreaming content, visual signals associated with the livestreaming content, scorecard, and sensor data. Tracking the data sources associated with the livestreaming content by analyzers in the system 150 is explained in detail with reference to FIG. 3 and is not explained herein for the sake of brevity.

At 708, the system 150 checks for events in the livestreaming content. More specifically, the livestreaming content is analyzed for spotting the occurrence of predefined changes, predefined actions, sudden change in audio/video intensity, anomalous change in expected event flow, and the like. In one illustrative example, a scorecard of a live match is continuously tracked to spot the occurrence of predefined changes or anomalous changes in expected event flow in the livestreaming content associated with a live program. In another illustrative example, audio signals associated with the livestreaming content are tracked to spot the occurrence of a sudden change in audio intensity. Similarly, the livestreaming content may be tracked to perform scene analysis/ visual analysis of the livestreaming content in substantially real-time to spot occurrence of predefined actions, sudden change in intensity or occurrence of anomalous change in the expected event flow. In yet another illustrative example, sensor data received from the event venue is tracked to spot occurrence of predefined changes.

At 710, event data is determined in relation to the detected event. When an event is detected, the system 150 is configured to collate one or more event attributes related to the event from the one or more data sources. These one or more event attributes configure the event data related to the event. Some examples of the event attributes include, but are not limited to, an identification of the livestreaming content, key performers related to the event, event timestamp, expected duration of the event, and event expiry time duration.

At 712, an event type associated with the detected event is determined based on the event data. More specifically, the event data is compared with a plurality of event profiles stored at an event database to determine the event type in relation to the livestreaming content. Each event profile of the plurality of event profiles includes a plurality of event attributes defining a corresponding event. As such, the one or more event attributes associated with the detected event are compared with corresponding event attributes of the plurality of event profiles to identify the event type associated with the detected event in the livestreaming content.

At 714, at least one applause audio related to the event is identified. More specifically, an applause repository stores a variety of applause audios in relation to different live events, such as events related to various professional sports games, theatrical performances, live shows, etc. As such, the event type and the event data are compared with stored data of a plurality of applause audio profiles in the applause repository to determine the at least one applause audio. For example, if the event data indicates a set point won by a second seeded player in a game of tennis played between top 2 seeded players in a Wimbledon match, the applause audio is selected from the applause audio profiles based on such event data (i.e., Wimbledon, key players, setpoint, etc.).

At 716, a value of an event status flag is determined. In an embodiment, the livestreaming content is continuously tracked based on the expected event duration to determine whether the event is still active or has expired. In general, a current timestamp is compared with the event timestamp to determine the time elapsed since the occurrence of the event. Accordingly, the system 150 assigns a value to an event status flag based on the timing analysis. The event status flag is assigned at least one of: a first value indicating an active status of the detected event and a second value indicating an expired status of the detected event. If the time elapsed is lesser than an event expiry time duration, then the event status flag associated with the detected event is assigned the first value and if the time elapsed is greater than the event expiry time duration, then the event status flag associated with the detected event is assigned the second value indicating the expired status of the detected event.

At 718, the system 150 checks the value of the event status flag. If the event status flag is assigned the first value, then step 720 is performed else, the system continues to track the data sources associated with the livestreaming content (see, step 706).

At 720, an enriched livestreaming content is generated. More specifically, the livestreaming content is adapted based on the at least one applause audio to generate the enriched livestreaming content. The at least one applause audio is combined with a corresponding audio portion of the livestreaming content for enriching the livestreaming content i.e., for generating the enriched livestreaming content. Accordingly, audio mixing, i.e. adjusting and combining (or blending) audio signals of the livestreaming content and the applause audio into a single audio is performed for generating the enriched livestreaming content.

At 722, playback of the enriched livestreaming content is facilitated on the electronic device of the viewer. The method ends at 722.

Figure 8:
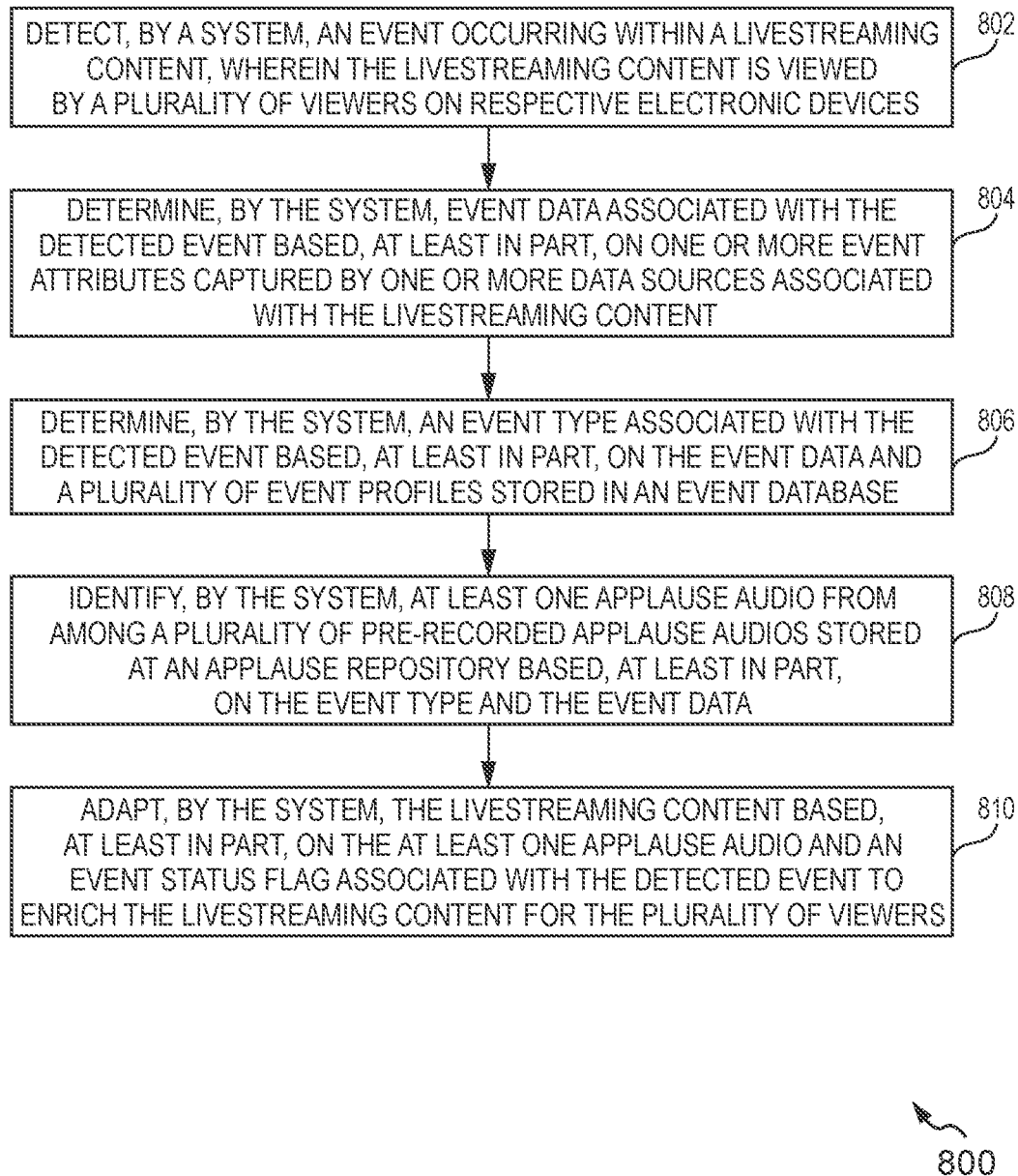
FIG. 8 shows a flow diagram of a method for enriching livestreaming content for content viewers, in accordance with an embodiment of the invention.

FIG. 8 shows a flow diagram of a method 800 for enriching livestreaming content for content viewers, in accordance with an embodiment of the invention. The various steps and/or operations of the flow diagram, and combinations of steps/operations in the flow diagram, may be implemented by, for example, hardware, firmware, a processor, circuitry, and/or by a system such as the system 150 explained with reference to FIGS. 1 to 7 and/or by a different device associated with the execution of software that includes one or more computer program instructions. The method 800 starts at operation 802.

At operation 802 of the method 800, an event occurring within a livestreaming content is detected by a system such as, the system 150 explained with reference to FIGS. 1 to 6. The livestreaming content is viewed by a plurality of viewers on respective electronic devices. In general, the livestreaming content may be played back in relation to a playback request for the livestreaming content received from the plurality of electronic devices. As such, one or more data sources associated with a livestreaming content are tracked for detecting the event. More specifically, the livestreaming content is analyzed for spotting the occurrence of predefined changes, predefined actions, sudden changes in audio/video intensity, anomalous change in expected event flow, and the like. Accordingly, the system 150 may be trained to analyze the one or more data sources independently or in parallel, to spot occurrence of predefined changes, predefined actions, sudden changes in audio/video intensity, anomalous change in expected event flow, and the like. In one illustrative example, a new performer such as, a singer walks into the stage humming may be detected as an event from change in audio intensity. In addition, scene analysis may detect a new performer on stage indicating occurrence of an anomalous change in the expected event flow.

At operation 804 of the method 800, event data associated with the detected event is determined based, at least in part, on one or more event attributes captured by one or more data sources associated with the livestreaming content. When an event is detected, the system 150 is configured to collate one or more event attributes related to the event from the one or more data sources. These one or more event attributes configure the event data related to the event. Some examples of the event attributes include, but are not limited to, an identification of the livestreaming content, key performers related to the event, event timestamp, expected duration of the event, and event expiry time duration.

At operation 806 of the method 800, an event type associated with the detected event is determined based, at least in part, on the event data and a plurality of event profiles stored in an event database. As such, the event data is compared with the plurality of event profiles to determine the event type in relation to the livestreaming content. Each event profile of the plurality of event profiles includes a plurality of event attributes defining a corresponding event. For example, event name (e.g., professional sports, music concert, etc.), event name (e.g., wicket, goal, victory, player walking in to bat, player retiring, performer starts to hum a popular song, completion of a dance performance, etc.), event duration, and the like that define characteristics of the event are event attributes. As such, the one or more event attributes related to the event are compared with corresponding event attributes of the plurality of event profiles to determine the event type. In one illustrative example, the event data captured by the one or more data sources may indicate event attributes such as, sport—tennis, event name—match point, Wimbledon, event duration—30 seconds and accordingly, the event type identified on mapping the event attributes indicating a player winning a Wimbledon tennis match.

At operation 808 of the method 800, at least one applause audio from among a plurality of pre-recorded applause audios stored at an applause repository is identified based, at least in part, on the event type and the event data. More specifically, the event type and the event data are compared with a plurality of pre-recorded applause audio profiles associated with the plurality of applause audios in an applause repository to determine the at least one applause audio. The applause repository stores a variety of pre-recorded applause audios in relation to different live events or live programs, such as events related to various professional sports games, theatrical performances, live shows, etc. In one illustrative example, if a performer sings a song in a live performance, the event data related to such a live program may include information, such as event name (i.e. live musical concert), song title (i.e., song name), the genre of the song rendered by the performer (for example, rock), type of musical instruments played in the background, and the like. Accordingly, the at least one applause audio that is most suitable for the live song performance may be identified from the applause repository. For example, an applause audio that matches a rhythm of the song performed by the performer may be selected from the applause repository.

At operation 810 of the method 800, the livestreaming content is adapted based, at least in part, on the at least one applause audio and an event status flag associated with the detected event to enrich the livestreaming content for the plurality of viewers. More specifically, the at least one applause audio is combined with a corresponding audio portion of the livestreaming content for enriching the livestreaming content. Accordingly, audio mixing, i.e. adjusting and combining (or blending) multiple audio signals into a single audio is performed for adapting the livestreaming content (i.e., generating the enriched livestreaming content). In an embodiment, the system 150 is configured to combine audio signals corresponding to the at least one applause audio with a corresponding portion of the livestreaming content if the event has not expired. Accordingly, the event status flag is determined to identify status of the detected event. In general, a timing analysis is performed based on the event data to determine the status of the detected event in the livestreaming content. More specifically, a current timestamp is compared with the event timestamp to determine the time elapsed since the occurrence of the event. If the time elapsed is less than an event expiry time duration, then the system 150 assigns a first value indicating an active status of the detected event for the event status flag and if the time elapsed is greater than the event expiry time duration, then event status flag associated with the detected event is assigned a second value indicating an expired status of the detected event. It is noted that if the event has expired (i.e., the event status flag is assigned the second value), then the applause audio is not combined with the livestreaming content and the plurality of viewers, in such a case, are only presented with the livestreaming content (i.e., the livestreaming content not including the applause audio). In one illustrative example, an actor receives an award in an award function which may be celebrated for a time duration within which the applause audio needs to be played back with the livestreaming content. If the time duration has elapsed and the actor starts talking about his achievement, then the applause audio is not combined with the livestreaming content.

The audio mixing of the livestreaming content with the at least one applause audio is performed in such a manner that the applause audio serves as a background sound of the livestreaming content. More specifically, the livestreaming content may still include original audio such as but is not limited to live commentary, live spectator sounds, cheering sounds and/or sound of players' voices in a professional sports game, and/or the sound of musical instruments, live performers' voices, and the audience cheering sounds in live performances. Moreover, it shall be noted that the livestreaming content is adapted in substantially real-time in response to the event detected in the livestreaming content. The method 800 ends at operation 810.

Figure 9:
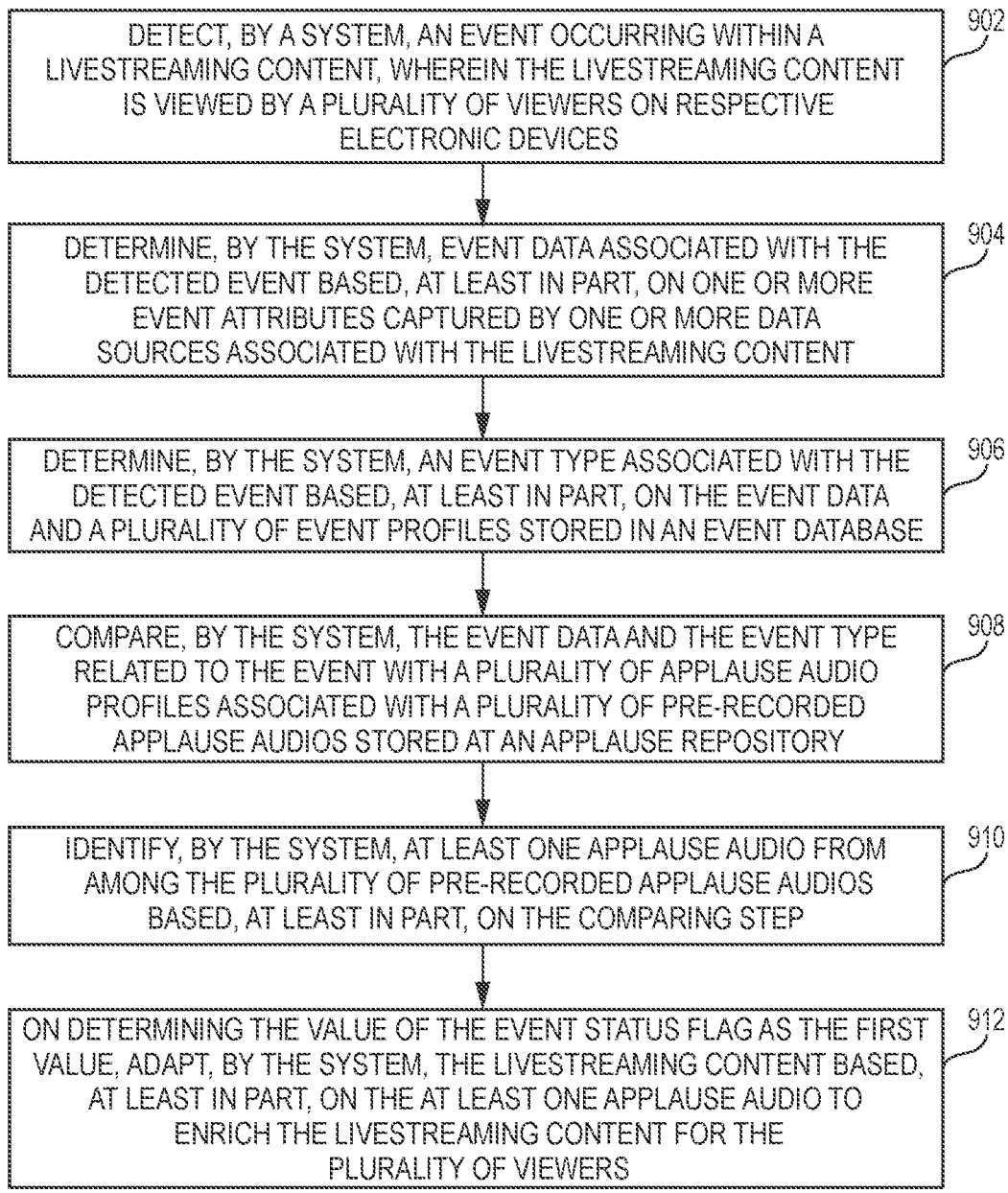
FIG. 9 shows a flow diagram of a method for enriching livestreaming content for content viewers, in accordance with another embodiment of the invention.

FIG. 9 shows a flow diagram of a method 900 for enriching livestreaming content for content viewers, in accordance with another embodiment of the invention. The various steps and/or operations of the flow diagram, and combinations of steps/operations in the flow diagram, may be implemented by, for example, hardware, firmware, a processor, circuitry and/or by a system such as the system 150 explained with reference to FIGS. 1 to 7 and/or by a different device associated with the execution of software that includes one or more computer program instructions. The method 900 starts at operation 902.

At operation 902 of the method 900, an event occurring within a livestreaming content is detected by a system such as, the system 150 explained with reference to FIGS. 1 to 6. The livestreaming content is viewed by a plurality of viewers on respective electronic devices. The livestreaming content is analyzed for spotting occurrence of predefined changes, predefined actions, sudden change in audio/video intensity, anomalous change in expected event flow, and the like. Accordingly, the system 150 may be trained to analyze one or more data sources associated with the livestreaming content, independently or in parallel, to detect the event in the livestreaming content. The detection of the event may be performed as explained with reference to FIG. 3 with conjunction to a module of the system 150, such as the event detection module 156.

At operation 904 of the method 900, event data associated with the detected event is determined based, at least in part, on one or more event attributes captured by one or more data sources associated with the livestreaming content. These one or more event attributes configure the event data related to the event. Some examples of the event attributes include, but are not limited to, an identification of the livestreaming content, key performers related to the event, event timestamp, expected duration of the event, and event expiry time duration. At operation 906 of the method 900, an event type associated with the detected event is determined based, at least in part, on the event data and a plurality of event profiles stored in an event database. In an embodiment, event data generated in relation to the event is compared with a plurality of event profiles to identify the event type.

At operation 908 of the method 900, the event data and the event type related to the event are compared with a plurality of applause audio profiles associated with a plurality of pre-recorded applause audios stored at the applause repository. The event type may be used to identify at least a set of applause audio profiles from the audio repository which is related to the same event. Thereafter, the one or more event attributes related to the event are compared with corresponding event attributes of each audio profile of the set of audio profiles to determine the at least one applause audio.

At operation 910 of the method 900, at least one applause audio from among the plurality of pre-recorded applause audios is identified based, at least in part, on the comparing step. The applause repository stores a variety of pre-recorded applause audios in relation to different live events, such as events related to various professional sports games, theatrical performances, live shows, etc. The selection of the at least one applause audio from the applause repository has been explained with reference to FIG. 4 and is not explained herein for the sake of brevity.

At operation 912 of the method 900, the livestreaming content is adapted based, at least in part, on the at least one applause audio to enrich the livestreaming content for the plurality of viewers. In an embodiment, the livestreaming content is combined with the at least one applause audio only when the detected event has not expired. The event status flag is assigned at least one of: a first value indicating an active status of the detected event and a second value indicating an expired status of the detected event. In general, a timing analysis is performed based on the event data to determine the status of the detected event in the livestreaming content. More specifically, a time of the difference between the current timestamp and event occurrence timestamp is compared with the event expiry time duration. If the time of difference is lesser than an event expiry time duration, then the system 150 assigns a first value indicating an active status of the detected event for the event status flag and when the time of difference is greater than the event expiry time duration, the event status flag associated with the detected event is assigned to a second value indicating an expired status of the detected event. It is noted that if the event has expired (i.e., the event status flag is assigned the second value), then the applause audio is not combined with the livestreaming content and the plurality of viewers, in such a case, are only presented with the livestreaming content (i.e., the livestreaming content not including the applause audio). The method 900 ends at operation 912.

Various embodiments disclosed herein provide numerous advantages. More specifically, the embodiments disclosed herein suggest techniques for generating an enriched livestreaming content. The events in a livestreaming content are detected in real-time by analyzing information from multiple sources related to the livestreaming content and a synthesized applause audio is combined with the livestreaming content in real-time to provide an enjoyable viewing experience to the users. The combination of the synthesized applause audio is performed in an automated manner. The real-time synthesis and playback of applause audio engage the viewers with events detected in the livestreaming content, thereby enhancing viewer experience of the livestreaming content. In some cases, the real-time synthesis and the playback of applause audio may simulate the experience of attending live events for viewers of livestreaming content. As the content viewer is engaged throughout the course of the live event and is also experiencing the in-venue feeling, an overall experience of the viewers of livestreaming content is increased manifold.

Additionally, adapting livestreaming content in real-time as described herein is a computer-based solution to a technical deficiency or problem that is itself rooted in computer technology (e.g., the problem itself derives from the use of computer technology). More specifically, adapting the livestreaming content in near real-time based on predefined rules or conditions is a significant problem for enriching the livestreaming content for viewers, especially with limited computer resources on the server-side. The present disclosure combines at least one applause audio in the livestreaming content based on detecting an event within the livestreaming content such that the viewer experience can be augmented. Furthermore, the present disclosure provides significantly more robust solutions because of handling simultaneous/concurrent processor execution (such as collating event attributes received from one or more data sources to determine event data and type of the detected event and determining applause audio based at least on the event data and stored applause audio profiles, simultaneously).

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 150 and its various components such as the processor 152, the memory 154, the I/O module 160, and the communication module 162 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor to perform one or more operations (for example, operations explained herein with reference to FIG. 7 Or 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer readable media can provide the program to a computer via a wired communication line (e.g., electric wires, and optical fibers) or a wireless communication line.

Various embodiments of the present invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method for enriching livestreaming content for viewers, the computer-implemented method comprising:
    detecting, by a system, an event occurring within a livestreaming content, wherein the livestreaming content is viewed by a plurality of viewers on respective electronic devices;
    determining, by the system, event data associated with the detected event based, at least in part, on one or more event attributes captured by one or more data sources associated with the livestreaming content, wherein the event data comprises an event expiry time duration;
    determining, by the system, an event type associated with the detected event based, at least in part, on the event data and a plurality of event profiles stored in an event database;
    identifying, by the system, at least one applause audio from among a plurality of pre-recorded applause audios stored at an applause repository based, at least in part, on the event type and the event data;
    in response to identifying the at least one applause audio, comparing, by the system, a time of difference between a current timestamp and an event occurrence timestamp with the event expiry time duration associated with the detected event;
    assigning, by the system, a value to an event status flag associated with the detected event based, at least in part, on the comparison; and
    adapting, by the system, the livestreaming content based, at least in part, on the at least one applause audio and the event status flag associated with the detected event to enrich the livestreaming content for the plurality of viewers.

2. The computer-implemented method as claimed in claim 1, wherein the event data further comprises the one or more event attributes related to: an identification of the livestreaming content, key performers related to the event, event timestamp, and expected duration of the event.

3. The computer-implemented method as claimed in claim 2, 
    wherein the event status flag is assigned to a first value indicating an active status for the detected event when the time of difference is lesser than the event expiry time duration, and
    wherein the event status flag is assigned to a second value indicating an expired status of the detected event when the time of difference is greater than the event expiry time duration.

4. The computer-implemented method as claimed in claim 3, wherein adapting the livestreaming content comprises:
    when the value of the event status flag is assigned to the first value, combining the at least one applause audio with a corresponding audio portion of the livestreaming content.

5. The computer-implemented method as claimed in claim 1, wherein the one or more data sources comprise at least one of: audio signals associated with the livestreaming content, visual signals associated with the livestreaming content, and scorecard and sensor data.

6. The computer-implemented method as claimed in claim 5, wherein detecting the event occurring within the livestreaming content comprises:
    analyzing the one or more data sources related to the livestreaming content to determine at least one of: predefined changes, predefined actions, sudden change in audio intensity, sudden change in video intensity, and anomalous change in expected event flow.

7. The computer-implemented method as claimed in claim 5, wherein the sensor data is received from a plurality of sensors deployed at different locations at an event venue associated with the livestreaming content.

8. The computer-implemented method as claimed in claim 5 further comprising:
    collating, by the system, the one or more event attributes related to the detected event from the one or more data sources, wherein the one or more event attributes configure the event data; and
    determining, by the system, the event type of the detected event by comparing the event data with each event profile of the plurality of event profiles,
    wherein the each event profile of the plurality of event profiles comprises a plurality of event attributes defining a corresponding event, and
    wherein the one or more event attributes related to the detected event are compared with corresponding event attributes of the plurality of event profiles to determine the event type.

9. The computer-implemented method as claimed in claim 8 wherein identifying the at least one applause audio comprises comparing the event data related to the detected event with a plurality of applause audio profiles associated with the plurality of pre-recorded applause audios.

10. The computer-implemented method as claimed in claim 1 wherein the livestreaming content is adapted in substantially real-time in relation to detection of the event.

11. A system for enriching livestreaming content for viewers, the system comprising:
    a memory for storing instructions; and
    a processor configured to execute the instructions and thereby cause the system to at least:

detect an event occurring within a livestreaming content, wherein the livestreaming content is viewed by a plurality of viewers on respective electronic devices;
determine event data associated with the detected event based, at least in part, on one or more event attributes captured by one or more data sources associated with the livestreaming content, wherein the event data comprises an event expiry time duration;
determine an event type associated with the detected event based, at least in part, on the event data and a plurality of event profiles stored in an event database;
identify at least one applause audio from among a plurality of pre-recorded applause audios stored at an applause repository based, at least in part, on the event type and the event data;
in response to identification of the at least one applause audio, compare a time of difference between a current timestamp and an event occurrence timestamp with the event expiry time duration associated with the detected event;
assign a value to an event status flag associated with the detected event based, at least in part, on the comparison; and
adapt the livestreaming content based, at least in part, on the at least one applause audio and the event status flag associated with the detected event to enrich the livestreaming content for the plurality of viewers.

12. The system as claimed in claim 11, wherein the event data further comprises the one or more event attributes related to: an identification of the livestreaming content, key performers related to the event, event timestamp, and expected duration of the event.

13. The system as claimed in claim 12,
wherein the value of the event status flag is assigned to a first value indicating an active status for the detected event when the time of difference is lesser than the event expiry time duration, and
wherein the value of the event status flag is assigned to a second value indicating an expired status of the detected event when the time of difference is greater than the event expiry time duration.

14. The system as claimed in claim 13, wherein, to adapt the livestreaming content, the system is further caused to combine the at least one applause audio with a corresponding audio portion of the livestreaming content when the value of the event status flag is assigned to the first value.

15. The system as claimed in claim 11, wherein the one or more data sources comprises at least one of: audio signals associated with the livestreaming content, visual signals associated with the livestreaming content, scorecard and sensor data.

16. The system as claimed in claim 15, wherein, to detect the event occurring within the livestreaming content, the system is further caused to at least:
analyze the one or more data sources related to the livestreaming content to determine at least one of: predefined changes, predefined actions, sudden change in audio intensity, sudden change in video intensity, and anomalous change in expected event flow.

17. The system as claimed in claim 15, wherein the sensor data is received from a plurality of sensors deployed at different locations at an event venue associated with the livestreaming content.

18. The system as claimed in claim 15, wherein the system is further caused to at least:
collate the one or more event attributes related to the detected event from the one or more data sources, wherein the one or more event attributes configure the event data; and
determine the event type of the detected event by comparing the event data with each event profile of the plurality of event profiles,
wherein the each event profile of the plurality of event profiles comprises a plurality of event attributes defining a corresponding event, and
wherein the one or more event attributes related to the detected event are compared with corresponding event attributes of the plurality of event profiles to determine the event type.

19. The system as claimed in claim 18, wherein for identifying the at least one applause audio, the system is further caused to compare the event data related to the detected event with a plurality of applause audio profiles associated with the plurality of pre-recorded applause audios.

20. A computer-implemented method for enriching livestreaming content for viewers, the computer-implemented method comprising:
detecting, by a system, an event occurring within a livestreaming content, wherein the livestreaming content is viewed by a plurality of viewers on respective electronic devices;
determining, by the system, event data associated with the detected event based, at least in part, on one or more event attributes captured by one or more data sources associated with the livestreaming content, wherein the event data comprises an event expiry time duration;
determining, by the system, an event type associated with the detected event based, at least in part, on the event data and a plurality of event profiles stored in an event database;
comparing, by the system, the event data and the event type related to the event with a plurality of applause audio profiles associated with a plurality of pre-recorded applause audios stored at an applause repository;
identifying, by the system, at least one applause audio from among the plurality of pre-recorded applause audios based, at least in part, on the comparing step;
in response to identifying the at least one applause audio, comparing, by the system, a time of difference between a current timestamp and an event occurrence timestamp with the event expiry time duration associated with the detected event;
assigning, by the system, a value to an event status flag associated with the detected event based, at least in part, on the comparison between the time of difference and the event expiry time duration; and
adapting, by the system, the livestreaming content based, at least in part, on the at least one applause audio and the event status flag associated with the detected event to enrich the livestreaming content for the plurality of viewers.

21. The computer-implemented method as claimed in claim 20, wherein the event data further comprises the one or more event attributes related to: an identification of the livestreaming content, key performers related to the event, event timestamp, and expected duration of the event.

22. The computer-implemented method as claimed in claim 20, wherein the value of the event status flag is assigned to a first value indicating an active status for the detected event when the time of difference is lesser than the event expiry time duration, and wherein the value of the event status flag is assigned to a second value indicating an expired status of the detected event when the time of difference is greater than the event expiry time duration.

\* \* \* \* \*